United States Patent
Brooks et al.

(10) Patent No.: US 10,025,640 B2
(45) Date of Patent: *Jul. 17, 2018

(54) BALANCING WORK OF TASKS AT A SENDING NODE OF A TRANSACTION SERVER

(71) Applicant: International Business Machines Corporation, Armonk, NY (US)

(72) Inventors: Michael D. Brooks, Hursley (GB); Alan Hollingshead, Hursley (GB); Julian C. Horn, Hursley (GB); Philip I. Wakelin, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/169,837

(22) Filed: Jun. 1, 2016

(65) Prior Publication Data

US 2017/0242735 A1  Aug. 24, 2017

Related U.S. Application Data

(63) Continuation of application No. 15/049,311, filed on Feb. 22, 2016.

(51) Int. Cl.
*G06F 9/50* (2006.01)
*G06F 9/46* (2006.01)
*H04L 12/801* (2013.01)

(52) U.S. Cl.
CPC .......... *G06F 9/5083* (2013.01); *G06F 9/466* (2013.01); *H04L 47/12* (2013.01)

(58) Field of Classification Search
CPC ...... H04L 67/1002; H04L 69/16; H04L 43/08
See application file for complete search history.

(56) References Cited

U.S. PATENT DOCUMENTS

| | | | | | |
|---|---|---|---|---|---|
| 5,983,292 | A | * | 11/1999 | Nordstrom | G06F 13/126 710/52 |
| 6,976,100 | B2 | * | 12/2005 | Dirstine | G06F 9/4881 710/19 |
| 2002/0026502 | A1 | * | 2/2002 | Phillips | H04L 29/06 709/219 |

OTHER PUBLICATIONS

List of IBM Patents or Patent Applictions Treated as Related; (Appendix P), Date Filed Jun. 1, 2016 2 pages.
U.S. Appl. No. 15/049,311, filed Feb. 22, 2016; Entitled: Balancing Work of Tasks at a Sending Node of a Transaction Server.

* cited by examiner

*Primary Examiner* — Abdullahi E Salad
(74) *Attorney, Agent, or Firm* — Cantor Colburn LLP; Steven Chiu

(57) ABSTRACT

Aspects include balancing work of tasks at a sending node of a transaction server in a network. A method can include processing a task from the top of a work queue at the sending node, where the task is an instance of a transaction which requires a transaction message to be sent from the sending node using a network connection. The transaction message is divided into chunks of partial transaction sub-messages. For each chunk, it can be dynamically determined whether a pacing response indicator is required based on metrics that monitor the activity in the work queue and a number of chunks of the transaction message already sent.

11 Claims, 8 Drawing Sheets

BALANCING WORK OF TASKS AT A SENDING NODE OF A TRANSACTION SERVER

DOMESTIC PRIORITY

This application is a continuation application of the legally related U.S. Ser. No. 15/049,311 filed Feb. 22, 2016, the contents of which are incorporated by reference herein in their entirety.

BACKGROUND

The present invention relates to a sending node of a transaction server in a network, and more specifically, to balancing work of tasks at a sending node of a transaction server in a network.

An on-line transaction processing (OLTP) monitor, such as CICS transaction server for z/OS (CICS and z/OS are trademarks of International Business Machines Corporation), contains a set of interfaces that it uses to communicate with other nodes in the networks that it wishes to interact with. Once a connection is established tasks, which are instances of transactions, running under the monitor's control can then send and receive messages using these interfaces. The size of these messages can potentially be very large and those that are large may be broken into smaller chunks that are transmitted separately and then recombined by the target node that they are delivered to.

In a busy system, many concurrent tasks may be running that wish to make use of the same network connection. However messages can only be transmitted one at a time, and so tasks will queue while waiting for their message to be transmitted. If the message size is very large then this can cause significant delays for other tasks in the queue.

To address this, many network protocols support a mechanism called pacing, which is intended to limit the number of message chunks that are sent before a task gives up control of the connection to allow others to make use of it. This is typically implemented using a pacing indicator which is added to a message chunk to indicate that no further chunks will be transmitted until a reply is received. This causes the task to become suspended until the partner node returns a pacing response message, after which it can re-join the queue of tasks waiting to use the connection and then transmit the next set of message chunks.

The maximum number of chunks that a task can transmit is defined by the message protocol that is being used. Some protocols used by transaction servers to communicate over a transmission control protocol/Internet protocol (TCP/IP) network sets a limit of four chunks before a task is placed into a pacing wait state. Such protocols then insert a pacing response indicator into the last chunk that is being transmitted, allowing the receiving node to recognize when it is being asked to return a pacing response message. This maximum number of chunks value is fixed for all tasks using a common network protocol and under some circumstances this can adversely affect the efficiency of the overall workload using a particular connection.

SUMMARY

According to embodiments, a method, system, and computer program product for balancing work of tasks at a sending node of a transaction server in a network. A method can include processing a task from the top of a work queue at the sending node, where the task is an instance of a transaction which requires a transaction message to be sent from the sending node using a network connection. The transaction message is divided into chunks of partial transaction sub-messages. For each chunk, it can be dynamically determined whether a pacing response indicator is required based on metrics that monitor the activity in the work queue and a number of chunks of the transaction message already sent.

BRIEF DESCRIPTION OF THE DRAWINGS

The subject matter regarded as the invention is particularly pointed out and distinctly claimed in the concluding portion of the specification. The forgoing and other features, and advantages of the invention are apparent from the following detailed description taken in conjunction with the accompanying drawings, in which:

DETAILED DESCRIPTION

Embodiments described herein enable a sending node of a transaction server, that has multiple clients with tasks requesting sending of transaction messages, to see how many tasks are queued waiting for the connection and to use this value to control whether a pacing indicator is added to a current message.

Figure 1:
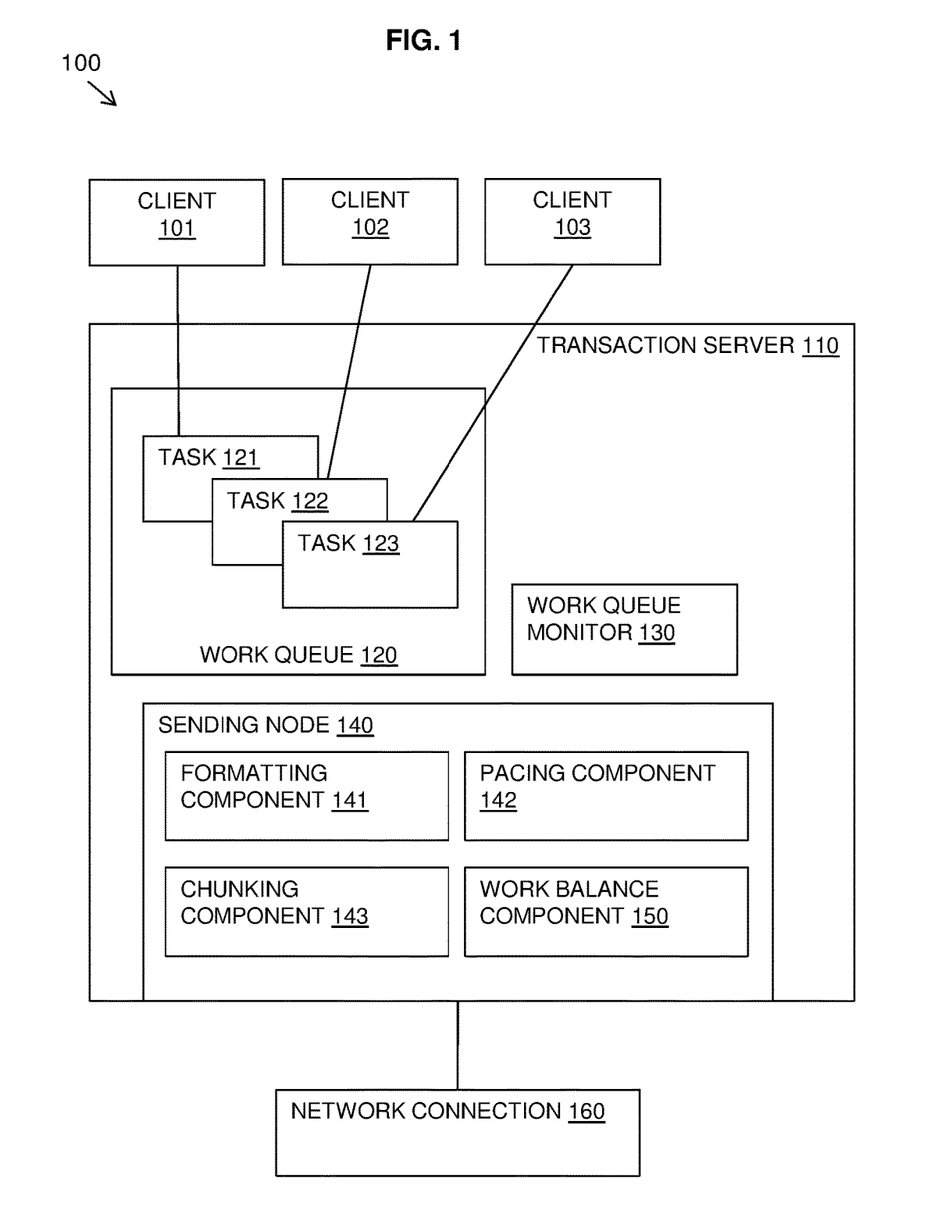
FIG. 1 is an example of a system in accordance with an embodiment of the present invention.

Referring to FIG. 1, a block diagram shows an example embodiment of a system 100 in which the described method and system may be implemented. FIG. 1 shows a transaction server 110, such as an on-line transaction processing monitor (OLTP), which may receive tasks 121-123 from multiple clients 101-103 which wish to send transaction messages using a network connection 160 to a target node in a network.

The tasks 121-123 may wait in a work queue 120 of the transaction server 110 until they are processed by a sending node 140. The sending node 140 may include a formatting component 141 for formatting a message into a suitable format for transmission by a sending protocol. The sending node 140 may include a chunking component 143 for dividing a transaction message into smaller chunks that are transmitted separately by the sending node 140 and then recombined by a target node that they are delivered to. The sending node 140 may also include a pacing component 142 for setting a pacing response indicator to a chunk of a message.

Multiple concurrent tasks may be running that wish to make use of the same network connection 160. However, messages can only be transmitted one at a time, and so tasks will queue in the work queue 120 while waiting for their message to be transmitted. If the message size is very large then this can cause significant delays for other tasks in the queue. To address this, the pacing component 142 limits the number of message chunks that are sent before a task gives up control of the connection 160 to allow other tasks to make use of it. A pacing response indicator is added to a message chunk to indicate that no further chunks will be transmitted until a reply is received. This causes the task to which the message chunk belongs to become suspended until the target node returns a pacing response message, after which the task can re-join the work queue 120 of tasks waiting to use the connection 160 and then transmit the next set of message chunks.

The described system includes a work balance component 150 at or in communication with the sending node 140 that balances the transaction message sending including the setting of pacing response indicators depending on a current depth of the work queue 120 as determined by a work queue monitor 130.

The queue depth may be checked by the work balance component 150 and then a decision may be made as to whether or not to add a pacing response indicator to the current message chunk. This test may only apply to the processing of large messages, as those that do not require chunking will not need a pacing response to be returned once they have been transmitted.

The work balance component 150 makes use of a rule that governs the relationship between queue depth and the maximum number of chunks that a task can transmit before waiting for a pacing response. The rule may be dynamically determined or may be configured by the persons controlling the systems that support the node.

In an example embodiment, a task running in a transaction server may wish to send a large message to a target system. Having reached the top of the work queue for the connection that the task wants to use, the sending node, which may be a network management component, builds the message into a format that can be transmitted through the network and, because it is a large message, breaks it in into a number of smaller chunks. The sending node may examine the rule that controls the pacing algorithm and may inspect the depth of the queue of tasks waiting to use the same connection, before deciding when to set the pacing response indicator in the current message.

Figure 2:
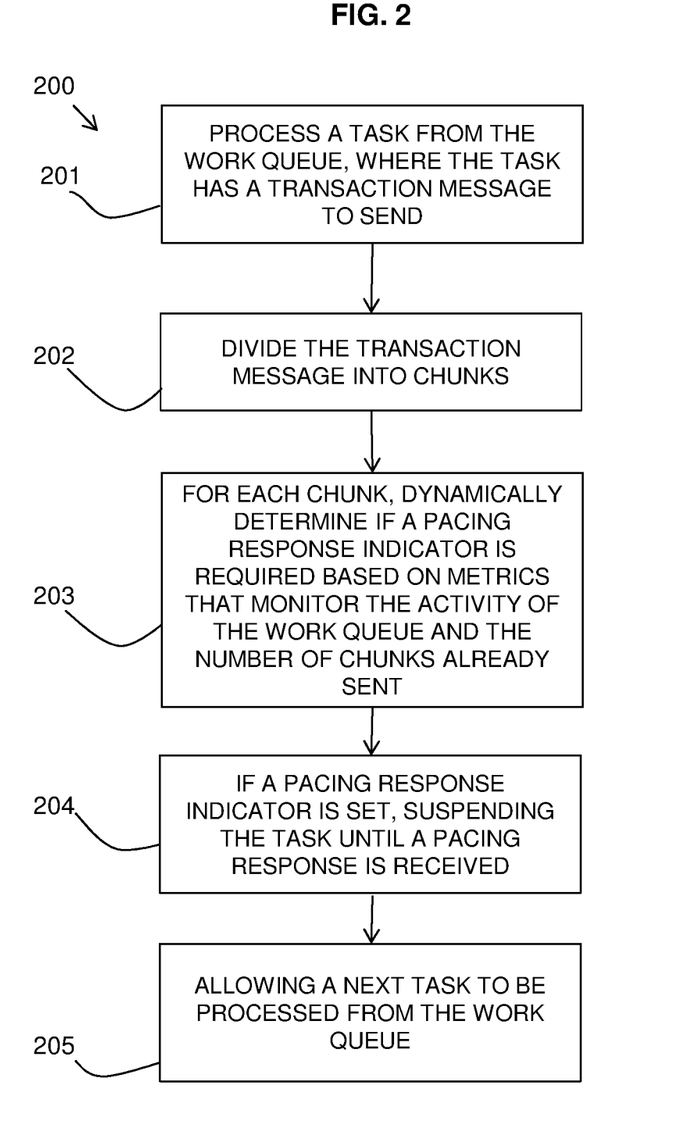
FIG. 2 is a flow diagram of an example method in accordance with an embodiment of the present invention.

Referring to FIG. 2, a flow diagram 200 shows an example embodiment of the described method as carried out by a sending node of a transaction server.

A task from a work queue is processed 201 that has a transaction message to send over the network connection. The transaction message may be divided 202 into chunks if the message is above a predefined size.

For each chunk, the described method may dynamically determine 203 if a pacing response indicator is required. This dynamic determination 203 may be based on metrics that monitor the activity of the work queue in combination with the number of chunks of the transaction message already sent. Further details of this dynamic determination are described in more detail below.

If it is determined that a pacing response indicator is required and a pacing response indicator is set 204, the task may be suspended until the pacing response is received from the target node. While the task is suspended, a next task from the work queue may be processed 205.

A pacing response indicator may be set more frequently for chunks when there is a high current depth of the work queue. This enables waiting tasks to have access to the network connection while other tasks await pacing responses from the target node. Each response message carries a unique identifier that is matched to a specific suspended task that then gets resumed.

On the other hand, if there is little demand on the network connection, the method also avoids forcing a task that is transmitting a very large message to repeatedly wait for pacing responses when there are no other tasks waiting to use the connection at that time.

In a situation in which there is a mixed workload, consisting of some tasks that transmit large messages while others send much smaller ones that varies over time, the impact of pacing response waits on the overall workload may be balanced so that not all the tasks are delayed but only those which are sending large amounts of data.

Figure 3:
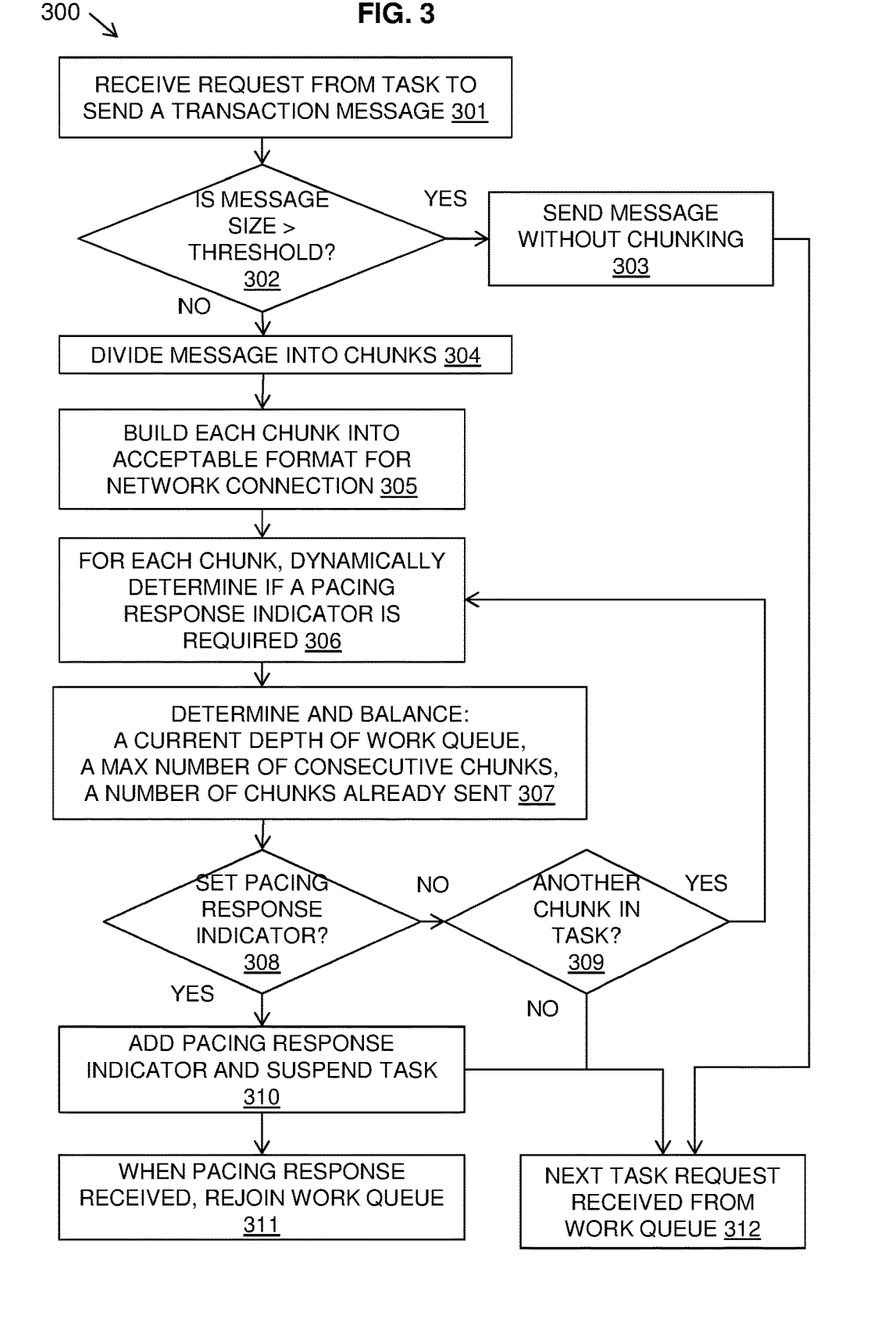
FIG. 3 is a flow diagram of a more detailed example of a method in accordance with an embodiment of the present invention.

Referring to FIG. 3, a flow diagram 300 shows a more detailed example embodiment of the described method.

A request may be received 301 from a task at the head of a work queue to send a transaction message. It may be determined 302 if the message size is above a threshold message size. The threshold message size may be configured or set by a sending protocol as the maximum size of message that can be sent as an integral message. If the message size is below the threshold, the message may be sent 303 in a single operation without dividing the message into chunks. The method may then receive a next task request 312 from the work queue and the method may repeat for the new request.

If the transaction message size is above the threshold message size, the message may be divided into chunks 304. Each chunk may be built 305 into an acceptable format for the network connection.

For each chunk, it may be dynamically determined if a pacing response indicator is required 306. This may be carried out by determining and balancing 307: a current depth of the work queue which indicates the current demand on the network connection; a maximum number of consecutive chunks that may be transmitted for a message; and a number of chunks already sent.

It may be determined 308 if a pacing response indicator is to be set based on the balancing 307. If a pacing response indicator is not to be set, then it may be determined if there is another chunk in the current transaction message of the task. If so, the method loops to dynamically determine 306 if a pacing response indicator is to be set in for this chunk. If there is not another chunk in the current transaction message, the method may receive a next task request 312 from the work queue and the method may repeat for the new request.

If it is determined at 308 that a pacing response indicator is to be set for a current chunk, a pacing response indicator is added 310 and the task is suspended pending the pacing response. In the meantime, the method may then receive a next task request 312 from the work queue and the method may repeat for the new request.

When the suspended task resumes it then processes the pacing response and if there are further chunks of its message that need sending it rejoins 311 the work queue for the connection that it has been using.

Figure 4:
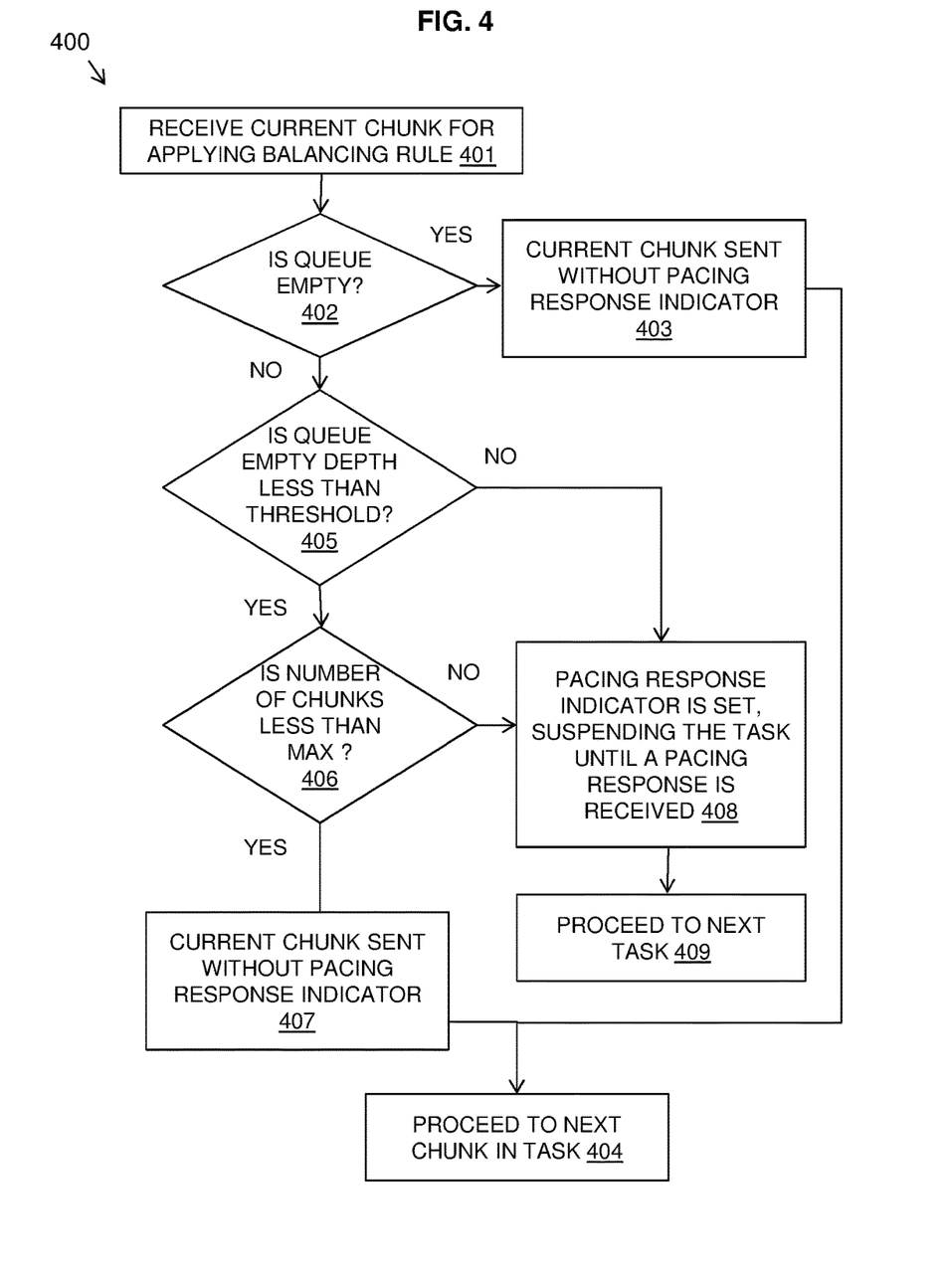
FIG. 4 is a flow diagram of an example of a further aspect of a method in accordance with an embodiment of the present invention.

Referring to FIG. 4, a flow diagram 400 shows an example embodiment of an aspect of the described method.

A current chunk may be received 401 to which a balancing rule may be applied to determine if a pacing response indicator is required to be set.

It may be determined 402 if the work queue is currently empty. If so, the current chunk may be sent 403 without a pacing response indicator as there are no tasks waiting in the work queue. The method may then proceed 404 to the next chunk in the transaction message of the task and the method may repeat.

If the work queue is determined 402 to not be empty, it may be determined 405 if the work queue depth is less than a threshold queue depth. If it is less than a threshold queue depth, then it may be determined 406 if the current number of consecutive chunks that have been sent for the transaction message since the beginning of the message or since a last pacing response was set, is below a maximum number of chunks. If the number of chunks is less than the maximum, then the current chunk may be sent 407 without a pacing response indicator. The method may then proceed 404 to the next chunk in the transaction message of the task and the method may repeat.

If it is determined at 405 that that current work queue depth is not less than the threshold work queue depth, then a pacing response indicator may be set 408 and the task suspended until a pacing response is received. A next task from the work queue may be processed 409.

If it is determined at 406, that a maximum number of consecutive chunks have been sent, then a pacing response indicator may be set 408 and the task suspended until a pacing response is received. A next task from the work queue may be processed 409.

A further aspect of this solution permits the sending node to be configured so that the thresholds of the work queue depth and/or number of consecutive chunks that may be sent are explicitly specified by the persons responsible for the sending node.

The described method decides when to request a pacing response based on the current activity of the network connection that it is using. It does not expect a pacing response following every chuck that is transmitted. The sending node adjusts the frequency of pacing responses using metrics that monitor activity within the system that is making use of the current network connection node.

The described method is not concerned with the transport layer and instead focuses on the activity of a network node that is being used by multiple clients to route work across a network. The described method concerns itself with actions against the socket layer. These actions by a network node relate to the redistribution of access to a network socket among a number of concurrent client processes, some or all of which intend sending large messages through it.

Figure 5:
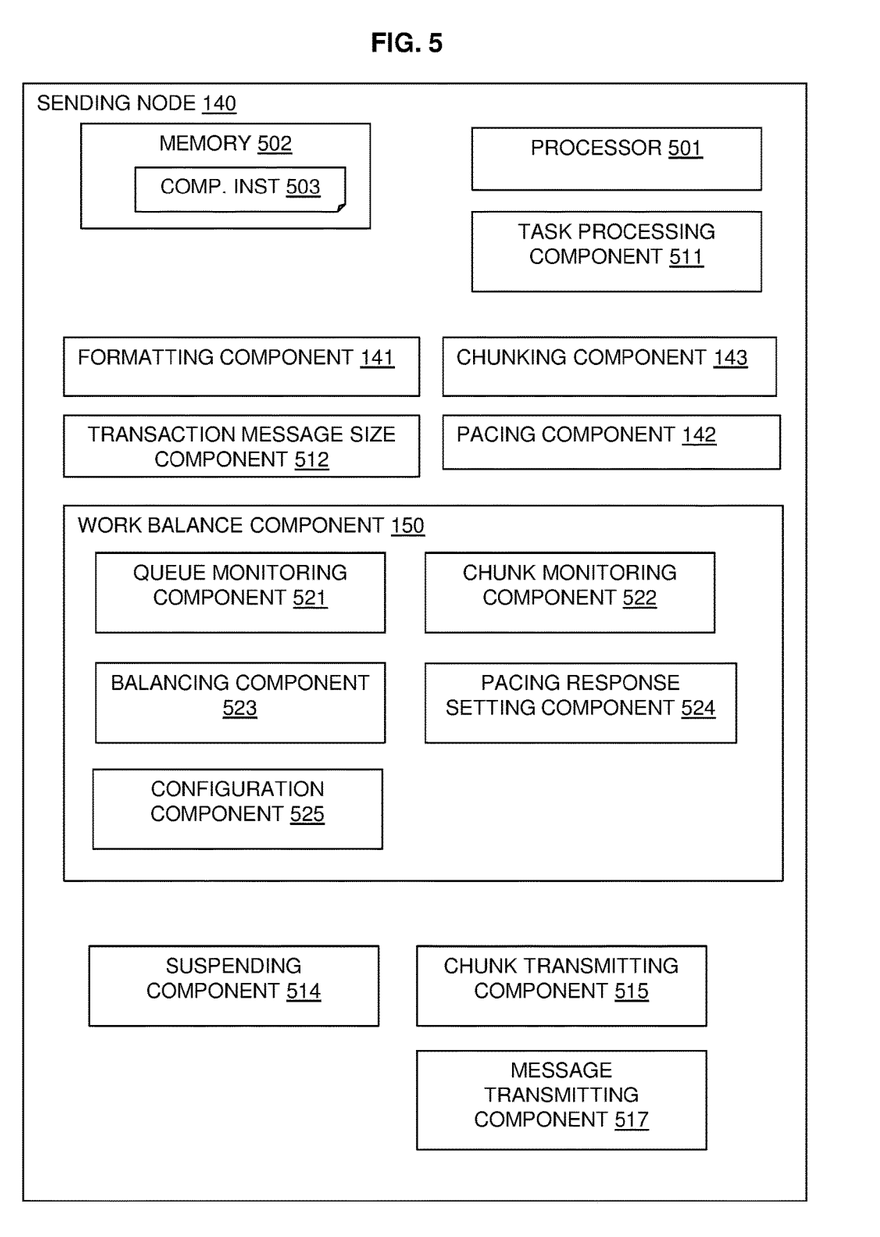
FIG. 5 is block diagram of an example of a system in accordance with an embodiment of the present invention.

FIG. 5 shows a block diagram of an example embodiment of the described system in which a sending node 140 which may be a network management component is provided that includes at least one processor 501, a hardware module, or a circuit for executing the functions of the described components which may be software units executing on the at least one processor. Memory 502 may be configured to provide computer instructions 503 to the at least one processor 501 to carry out the functionality of the components.

As described in relation to FIG. 1, the sending node 140 may include a formatting component 141 for formatting messages or message chunks for sending via a network connection, a chunking component 143 for dividing a transaction message into message chunks, and a pacing component 142 for adding a pacing response indicator to a message chunk.

The sending node 140 may include a transaction message size component 512 for determining if a transaction message is below a threshold message size that may be sent as a single operation without dividing the message into chunks.

The sending node 140 may also include a suspending component 514 for suspending a task when a pacing response indicator has been sent whilst awaiting the pacing response from the target node.

The sending node 140 may also include a chunk transmitting component 515 for transmitting a message chunk, which may or may not include an applied pacing response indicator, and a message transmitting component 517 for transmitting an entire transaction message if it is below the threshold size.

The sending node 140 may also include a work balance component 150 for determining when to apply a pacing response indicator to a message chunk based on the current demand on the network connection by tasks in the work queue.

The work balance component 150 may include a queue monitoring component 521 for monitoring the depth of the work queue at the sending node dynamically, a chunk monitoring component 522 for monitoring a number of chunks sent consecutively in for a message. The work balance component 150 may include a balancing component 523 for applying a balancing rule balancing the queue depth and the number of chunks already sent for a message. The work balance component 150 may include a configuration component 525 for setting and altering the thresholds used by the balancing rule of the balancing component 523 including the work queue depth threshold and the maximum number of consecutive chunks for a message. The work balance component 150 may include a pacing response setting component 524 for setting a pacing response for a message chunk, if required.

According to an embodiment of the present invention there is provided a method for balancing work of tasks at a sending node of a transaction server in a network, comprising: processing a task from the top of a work queue at the sending node, wherein a task is an instance of a transaction which requires a transaction message to be sent from the sending node using a network connection; dividing the transaction message into chunks of partial transaction submessages; and for each chunk, dynamically determining if a pacing response indicator is required based on metrics that monitor the activity in the work queue and a number of chunks of the transaction message already sent.

This can enabling the method to determine if the network connection is in demand and adjusting the frequency of pacing response indicators based on the demand.

The method may include setting a pacing response indictor for a chunk if a pacing response indicator is required, and suspending the task until a pacing response is received allowing a next task to be processed from the work queue.

Dynamically determining if a pacing response indicator is required may include determining a balance between a current depth of the work queue, a maximum number of chunks that a task is allowed to transmit consecutively, and a number of chunks of the transaction message already sent. Determining a balance may include increasing a frequency of pacing response indicators for chunks when there is a high current depth of the work queue.

Determining a balance may include determining that there are no waiting tasks in the work queue and transmitting the current chunk without a pacing response indicator. Alternatively, determining a balance may include determining that the current depth of the work queue is not empty and is below a queue threshold, determining how many chunks of the transaction message have been sent since a past pacing wait and, if this is below the maximum number of chunks that a task is allowed to transmit consecutively, sending the current chunk without a pacing response indicator. If the number of chunks of the transaction message that have been sent since a past pacing wait is not below the maximum number of chunks that a task is allowed to transmit consecutively, the method may include sending the current chunk with a pacing response indicator, and suspending the current task until a pacing response is received. Determining a balance may include determining that the current depth of the work queue is above a queue threshold, wherein the method may send the current chunk with a pacing response indicator, and suspending the current task until a pacing response is received.

The method may include a pre-processing step of determining if a transaction message is below a threshold size and, if so, sending the transaction message as a whole message without breaking the transaction message into chunks.

The maximum number of chunks that a task is allowed to transmit consecutively may be configurable. The queue threshold may also be configurable.

According to an embodiment of the present invention there is provided a system for balancing work of tasks at a sending node of a transaction server in a network, comprising a processor and a memory configured to provide computer program instructions to the processor to execute the function of the following components: a task processing component for processing a task from the top of a work queue at the sending node, wherein a task is an instance of a transaction which requires a transaction message to be sent from the sending node using a network connection; a chunking component for dividing the transaction message into chunks of partial transaction sub-messages; and a work balance component, for each chunk, dynamically determining if a pacing response indicator is required based on metrics that monitor the activity in the work queue and a number of chunks of the transaction message already sent.

The system may include a pacing response setting component for setting a pacing response indictor for a chunk if a pacing response indicator is required. The system may also include a suspending component, wherein if a pacing response indicator is set, suspending the task until a pacing response is received allowing a next task to be processed from the work queue.

The work balance component for dynamically determining if a pacing response indicator is required may include a balancing component for determining a balance between a current depth of the work queue, a maximum number of chunks that a task is allowed to transmit consecutively, and the number of chunks of the transaction message already sent. The balancing component for determining a balance may include increasing a frequency of pacing response indicators for chunks when there is a high current depth of the work queue.

The work balancing component may include a queue monitoring component including an empty queue determining component for determining that there are no waiting tasks in the work queue. The work balancing component may further include a queue monitoring component including a queue threshold component for determining that the current depth of the work queue is not empty and is above or below a queue threshold. The work balancing component may also include a chunk monitoring component for determining how many chunks of the transaction message have been sent since a past pacing wait and if this is below the maximum number of chunks that a task is allowed to transmit consecutively.

The system may include a chunk transmitting component for sending the current chunk with or without a pacing response indicator.

The system may include a transaction message size component for determining if a transaction message is below a threshold size and, if so, sending the transaction message as a whole message without breaking the transaction message into chunks. A message transmitting component may be provided for sending a transaction message.

The system may include a configuration component for configuring a maximum number of chunks that a task is allowed to transmit consecutively and a queue threshold.

According to another aspect of the present invention there is provided a computer program product for balancing work of tasks at a sending node of a transaction server in a network, the computer program product comprising a computer readable storage medium having program instructions embodied therewith, the program instructions executable by a processor to cause the processor to: process a task from the top of a work queue at the sending node, wherein a task is an instance of a transaction which requires a transaction message to be sent from the sending node using a network connection; divide the transaction message into chunks of partial transaction sub-messages; and for each chunk, dynamically determine if a pacing response indicator is required based on metrics that monitor the activity in the work queue and a number of chunks of the transaction message already sent.

The computer program product may dynamically determine if a pacing response indicator is required includes determining a balance between a current depth of the work queue, a maximum number of chunks that a task is allowed to transmit consecutively, and a number of chunks of the transaction message already sent.

Embodiments can be utilized to allow a sending node to decide when to request a pacing response based on the current activity of the network connection that it is using.

Figure 6:
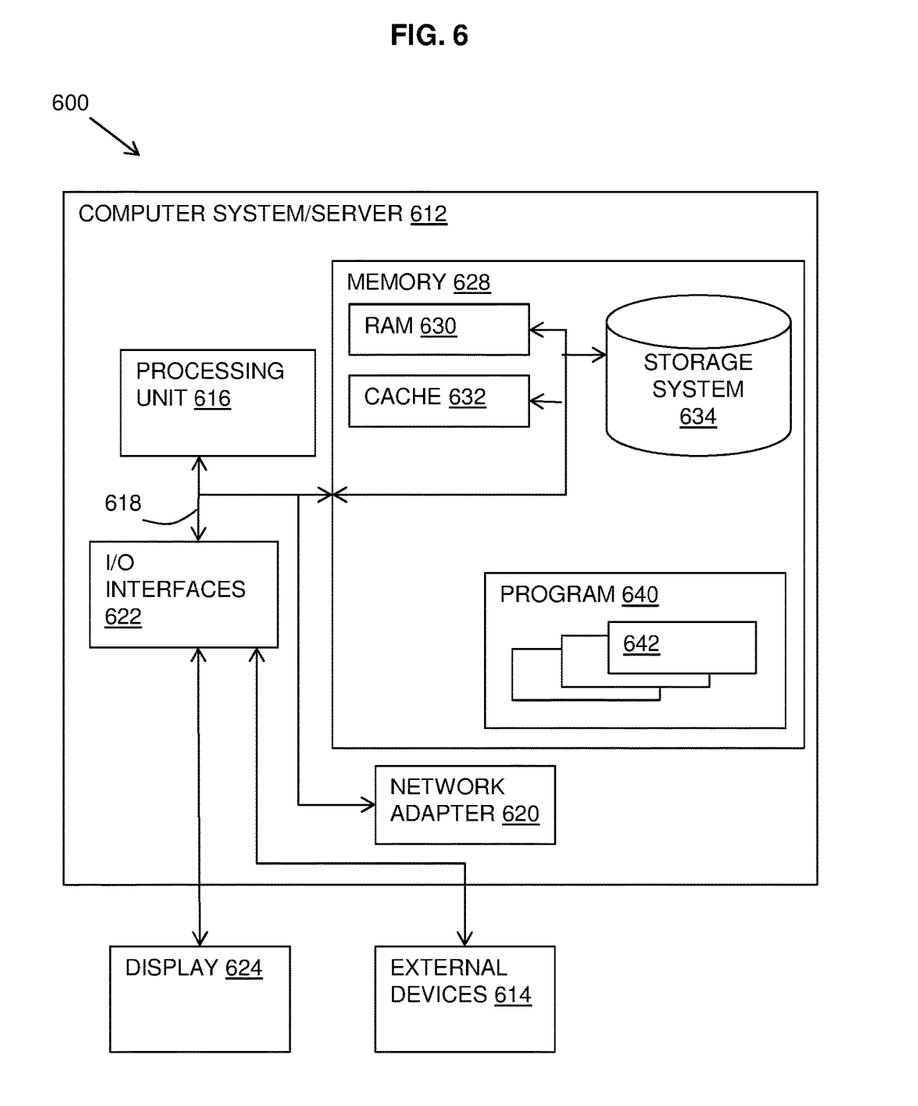
FIG. 6 is a block diagram of a computer system or cloud server in which an embodiment of the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
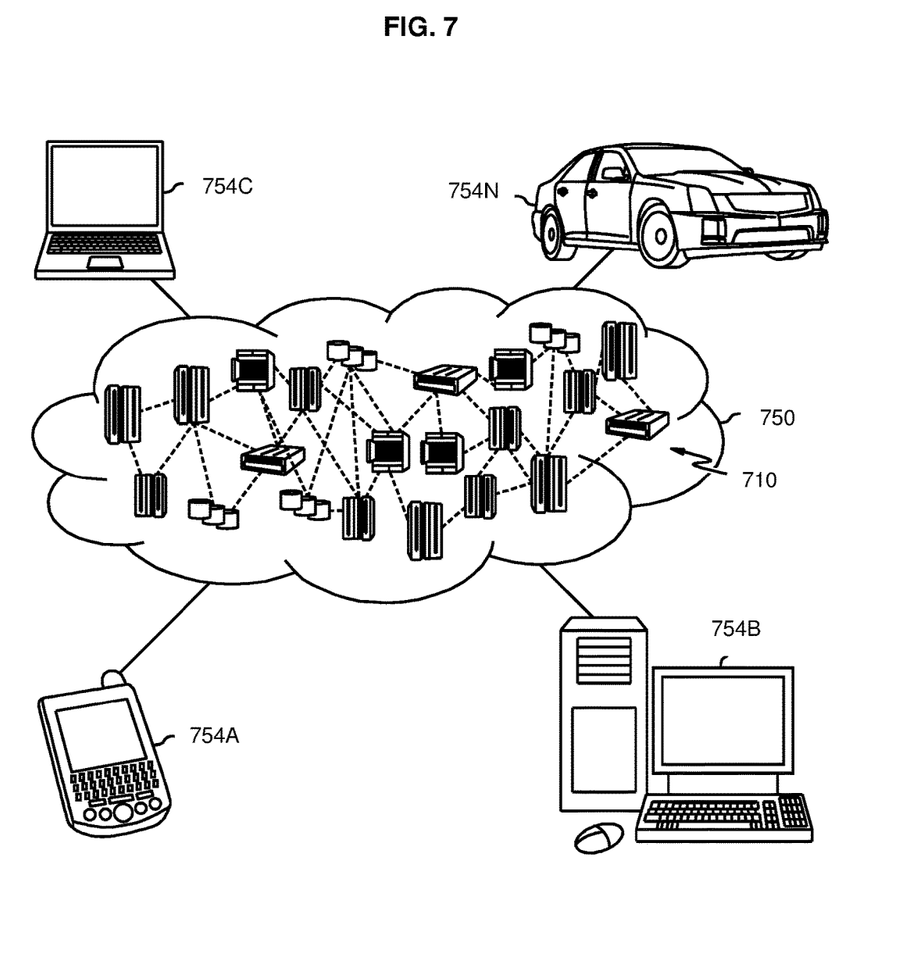
FIG. 7 is a schematic diagram of a cloud computing environment in which an embodiment of the present invention may be implemented.

Referring now to FIG. 7, illustrative cloud computing environment 750 is depicted. As shown, cloud computing environment 750 comprises one or more cloud computing nodes 600 with which local computing devices used by cloud consumers, such as, for example, personal digital assistant (PDA) or cellular telephone 754A, desktop computer 754B, laptop computer 754C, and/or automobile computer system 754N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 600 and cloud computing environment 750 can communicate with any type of computerized device over any type of network and/or network addressable connection (e.g., using a web browser).

Figure 8:
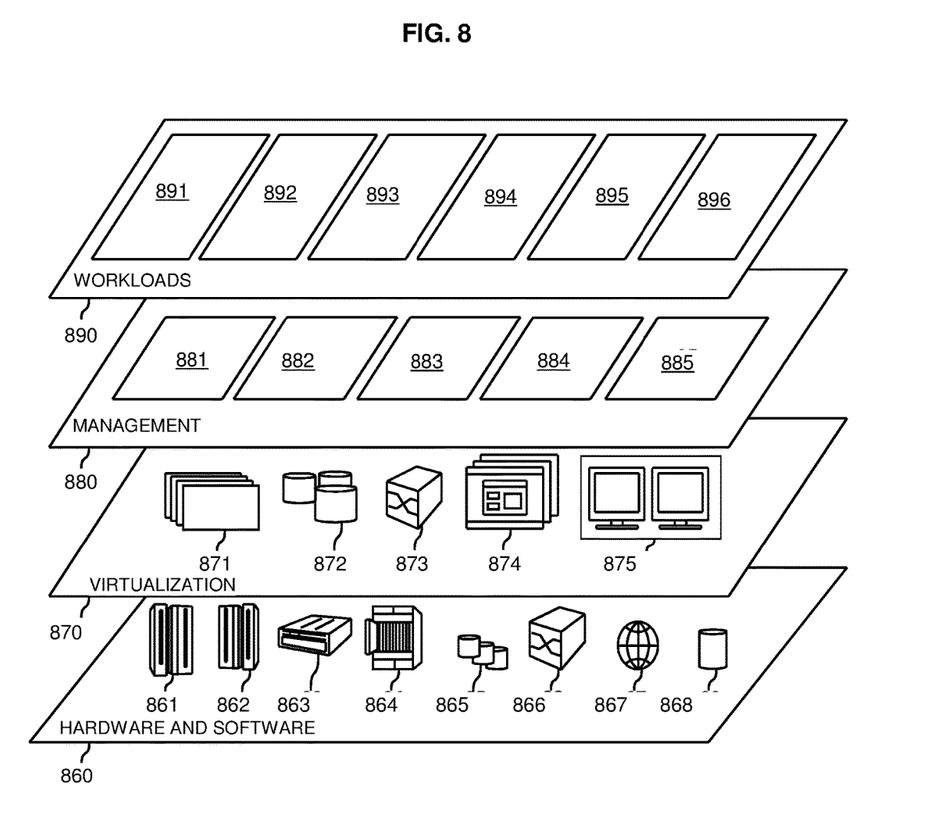
FIG. 8 is a diagram of abstraction model layers of a cloud computing environment in which an embodiment of the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; and transaction processing 895 including work balancing at a transaction server 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for balancing work of tasks at a sending node of a transaction server in a network, the method comprising:
   processing a task from the top of a work queue at the sending node, wherein a task is an instance of a transaction which requires a transaction message to be sent from the sending node using a network connection;
   dividing the transaction message into chunks of partial transaction sub-messages; and
   for each chunk, dynamically determining whether a pacing response indicator is required based on metrics that monitor the activity in the work queue and a number of chunks of the transaction message already sent.

2. The method as claimed in claim 1, further including setting a pacing response indictor for a chunk if a pacing response indicator is required, and suspending the task until a pacing response is received allowing a next task to be processed from the work queue.

3. The method as claimed in claim 1, wherein the dynamically determining whether a pacing response indicator is required includes determining a balance between a current depth of the work queue, a maximum number of chunks that a task is allowed to transmit consecutively, and a number of chunks of the transaction message already sent.

4. The method as claimed in claim 3, wherein the determining a balance includes increasing a frequency of pacing response indicators for chunks when there is a high current depth of the work queue.

5. The method as claimed in claim 3, wherein the determining a balance includes determining that there are no waiting tasks in the work queue and transmitting the current chunk without a pacing response indicator.

6. The method as claimed in claim 3, wherein the maximum number of chunks that a task is allowed to transmit consecutively is configurable.

7. The method as claimed in claim 3, wherein the determining a balance includes determining that the current depth of the work queue is not empty and is below a queue threshold, determining how many chunks of the transaction message have been sent since a past pacing wait and, based on the number of chunks being below the maximum number of chunks that a task is allowed to transmit consecutively, sending the current chunk without a pacing response indicator.

8. The method as claimed in claim 7, wherein based on the number of chunks of the transaction message that have been sent since a past pacing wait being below the maximum number of chunks that a task is allowed to transmit consecutively, sending the current chunk with a pacing response indicator, and suspending the current task until a pacing response is received.

9. The method as claimed in claim 7, wherein the determining a balance further includes determining that the current depth of the work queue is above a queue threshold, sending the current chunk with a pacing response indicator, and suspending the current task until a pacing response is received.

10. The method as claimed in claim 7, wherein the queue threshold is configurable.

11. The method as claimed in claim 1, further including determining whether a transaction message is below a threshold size and, based on the transaction message being below the threshold size, sending the transaction message as a whole message without breaking the transaction message into chunks.

* * * * *